United States Patent
Numata et al.

(10) Patent No.: US 6,967,917 B1
(45) Date of Patent: Nov. 22, 2005

(54) OPTICAL DISK AND OPTICAL DISK APPARATUS USING SPATIALLY SEPARATED GROOVES AND LANDS FOR RECORDING TRACKS

(75) Inventors: Tomiyuki Numata, Tenri (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/561,856

(22) Filed: Apr. 28, 2000

(30) Foreign Application Priority Data

Apr. 28, 1999 (JP) ................................ 11-121105

(51) Int. Cl.⁷ ................................................ G11B 5/58
(52) U.S. Cl. ................................ 369/53.17; 369/53.26
(58) Field of Search .................... 369/30.04, 30.24, 369/30.25, 32.01, 33.01, 47.14, 47.5, 47.51, 369/47.52, 47.55, 53.15, 53.16, 53.17, 53.26, 369/53.37, 275.3

(56) References Cited

U.S. PATENT DOCUMENTS 5,404,357 A    4/1995  Ito et al.
6,038,209 A  * 3/2000  Satoh .................. 369/275.3

OTHER PUBLICATIONS

German Patent Office Action dated Aug. 7, 2001 re Serial No. 100 21 079.1-53 and English translation.
"AS-MO (Advanced Storage-Magneto Optical Disk) Version 1.0, Part 1—Physical Specifications—" (FUJITSU LIMITED, Hitachi, Ltd., Hitachi Maxell, Ltd., Imation Corp. OLYMPUS OPTICAL CO., LTD., Philips Electronics N.V., Sanyo Electric Co., Ltd., Sharp Corporation, Sony Corporation, pp. cover, i-vii, 53-64, Apr. 1998.).

* cited by examiner

Primary Examiner—Paul W. Huber
(74) Attorney, Agent, or Firm—Edwards & Angell, LLP; David G. Conlin; George W. Hartnell, III

(57) ABSTRACT

An optical disk using both grooves and lands as a recording track is provided with ① a data area for recording/reproducing data and ② DMAs (Data Management Areas) for managing a defective sector in the data area. The DMAs include four DMAs A–D all formed on the lands. The DMA B(D) is formed behind the ending sector of the DMA A(C). This arrangement realizes a DMA format having high resistance to defects and improving a processing rate. Consequently, highly reliable optical disk and optical disk apparatus can be provided.

2 Claims, 13 Drawing Sheets

OPTICAL DISK AND OPTICAL DISK APPARATUS USING SPATIALLY SEPARATED GROOVES AND LANDS FOR RECORDING TRACKS

FIELD OF THE INVENTION

The present invention relates to an optical disk and a recording/reproducing apparatus employing such an optical disk, and more particularly, to an optical disk capable of managing information of a defective sector in the optical disk in a reliable manner and an optical disk apparatus employing such an optical disk.

BACKGROUND OF THE INVENTION

An optical disk apparatus, such as a magneto-optical disk apparatus, for recording data and reading out the recorded data by means of a semiconductor laser has been used extensively as an information recording/reproducing apparatus for recording and saving, for example, image data of a large volume.

With an erasable (overwritable) optical disk, such as a magneto-optical disk, data is recorded/reproduced sector by sector provided in the recording track. Each sector is assigned with a physical address (pit) by means of injection molding or 2P process when the disk is manufactured.

An optical disk may have a defect due to a flaw on the substrate or a failure, such as a pin hole in the recording film, caused when molding the optical disk substrate, or a surface flaw of the optical disk substrate caused during the use. If a sector has such a defect, data can not be recorded/reproduced into/from this defective sector correctly. Thus, before the use (delivery) or during the use of the optical disk, a defective sector in the optical disk is detected so as not to use the detected defective sector when actually recording/reproducing data.

In order to record/reproduce data by avoiding the defective sector, the optical disk is provided with defect management areas (hereinafter, abbreviated to DMAs) into which information (defect management information) as to an address of the defective sector and the structure of the optical disk is recorded.

An optical disk employed as a recording medium for the foregoing optical disk apparatus should comply with the ISO (International Standards Organization) standard and the AS-MO (Advanced Storage-Magneto Optical Disk) standard.

FIG. 11 shows a physical alignment of the DMAs in an optical disk in compliance with the 90-mm media ISO standard.

A user data area 11E used in recording user data, such as image information, is sandwiched by four DMAs in total: DMAs 11A and 11B in the inner side and DMAs 11C and 11D in the outer side.

FIG. 12 shows a physical alignment of the DMAs in an optical disk in compliance with the AS-MO standard. In the AS-MO standard, both lands and grooves in the optical disk are used as recording tracks to increase a recording density.

Like the medium shown in FIG. 11, four DMAs are also provided in the optical disk of FIG. 12. Outer grooves of a data area 12E are allocated as a DMA 12A and outer lands of the data area 12E are allocated as a DMA 12B. Likewise, inner grooves and lands of the data area 12E are allocated as DMAs 12C and 12D, respectively. Thus, according to the AS-MO standard, the DMAs 12A and 12B or the DMAs 12C and 12D are aligned alternately in every other track.

Here, four DMAs are provided to ensure reliability of the optical disk. More precisely, if a defect is caused in the DMA due to a surface flaw or the like of the optical disk, the management information can no longer be recorded or reproduced, thereby making the optical disk totally inoperable. Therefore, the same defect management information is recorded into four DMAs to ensure safety.

An optical disk apparatus reproduces the defect management information recorded in the DMAs at the start-up and stores the same in its memory, and refers to the stored information when recording or reproducing data later, thereby avoiding the use of a defective sector.

FIGS. 13 and 14 show flowcharts detailing actions when an optical disk apparatus employing an optical disk in compliance with the AS-MO standard reproduces/records defect management information from/into the DMAs 12A–12D.

FIG. 13 shows reproduction of the defect management information. The reproduction of the defect management information starts when an optical disk is inserted into the optical disk apparatus. That is, the head of the DMA 12A positioned in the outer side is accessed (S21) followed by tracking servo in the groove track (S22). Then, reproduction from the DMA 12A starts from the outer side to the inner side (S23), after which whether the defect management information has been reproduced correctly or not is judged (S24). If the defect management information recorded in the DMA 12A has been reproduced correctly, the reproduction is terminated.

However, if the defect management information recorded in the DMA 12A has not been reproduced correctly by a defect or the like on the optical disk, the head of the DMA 12B also positioned in the outer side is accessed (S25) followed by tracking servo in the land track (S26) Then, reproduction from the DMA 12B starts from the outer side to the inner side (S27). If the defect management information has not been reproduced correctly again, reproduction from the DMA 12C and DMA 12D (S29–S36) is carried out as necessary in the same manner.

FIG. 14 shows recording of the defect management information. When a new defective sector is detected in the data area, new defect management information is generated (not shown), and as is with the reproduction, the head of the DMA 12A is accessed (S37) followed by tracking servo in the groove track (S38). Then, recording into the DMA 12A starts from the outer side to the inner side (S39). Subsequently, the head of the DMA 12B also positioned in the outer side is accessed (S40) followed by tracking servo in the land track (S41). Then, recording into the DMA 12B starts from the outer side to the inner side (S42). Thereafter, recording into the DMAs 12C and 12D both positioned in the inner side is carried out sequentially in the same manner (S43–S48). Consequently, the new defect management information is recorded into four DMAs unconditionally.

However, the foregoing arrangement of the conventional optical disk has the following problem. That is, the defect management information recorded in the DMAs is read out only after the optical disk is inserted into the optical disk apparatus, and there is no way to give the same to the optical disk apparatus in advance. Moreover, should a defect be caused in all the four DMAs, information can not be reproduced from any of the DMAs, thereby making the optical disk totally inoperable. Under these conditions, there has been an increasing need to ensure reliability of the defect management information.

The ISO standard sets forth the recording track pitch as $1.6\,\mu\text{m}$. Thus, if a defect of some micrometers wide is caused in the DMA 11A, more than one recording track becomes defective, and when this happen, an error can not be corrected. Thus, there is a problem that, because the DMA 12A out of four DMAs is no longer operable, the reliability of the defect management information is decreased.

In addition, if a defect is caused at the boundary between two adjacent DMAs, such as the DMAs 11A and 11B, there arises another problem that two out of four DMAs become inoperable at the same time.

The above problem is more serious with the optical disk in compliance with the AS-MO standard. More precisely, this type of optical disk adopts a recording method, by which information is recorded into both the lands and grooves constituting the recording track so as to increase a recording density. However, because the track pitch is as small as 0.6 μm, even a microscopic defect may possibly lie off more than one recording track.

In addition, assume that the DMAs 12A and 12B are provided in the grooves and lands alternately in every other track, for example. Then, the DMAs 12A and 12B are adjacent to each other throughout the recording track. Thus, if a defect such that lies over more than one track is caused in anywhere in the DMA 12A or 12B, both the DMAs 12A and 12B become totally inoperable at the same time.

With the optical disk apparatus employing the optical disk in compliance with the AS-MO standard, as has been discussed, the recording/reproducing into/from the DMA 12B is carried out following the recording/reproducing into/from the DMA 12A, and an access action is necessary in order to move from the last sector of the DMA 12A to the first sector of the DMA 12B. This raises a problem that the time required for the defect management information recording/reproducing is extended undesirably, thereby decreasing a processing rate of the optical disk apparatus.

SUMMARY OF THE INVENTION

It is therefore an object of the present invention to provide highly reliable optical disk and optical disk apparatus employing the same by providing a DMA format that realizes excellent resistance to defects and a high processing rate.

In order to fulfill the above and other objects, an optical disk of the present invention is characterized by being furnished with a plurality of defect management areas, provided separately along a radius direction of the optical disk, for recording defect management information used in managing a defective sector, each of the plurality of defect management areas having a plurality of defect recording tracks for recording the defect management information, the plurality of defect recording tracks being separated from each other by at least one track other than the plurality of defect recording tracks.

According to the above arrangement, a plurality of defect management areas are provided separately along the radius direction of the optical disk, and each defect management area is provided with a plurality of defect recording tracks, into which the defect management information used in managing the defective sector is recorded.

Incidentally, the defect recording tracks for recording the defect management information are provided adjacently in a conventional optical disk. However, the arrangement of the conventional optical disk has the following problem.

That is, the track pitch in the today's optical disk is kept reduced in order to increase the recording density. Hence, according to the conventional arrangement, even a quite small defect has a high possibility that it will lie off more than one recording track. Thus, if a defect such that lies off more than one recording track is caused, the defect management information can not be recorded/reproduced correctly, thereby posing a problem that the optical disk becomes totally inoperable.

In addition, in the conventional optical disk, a plurality of defect management recording areas are provided adjacently without securing a track other than the defect recording tracks at the boundaries. Thus, if a defect occurs at the boundary, more than one defect management recording area possibly becomes inoperable at the same time.

In contrast, according to the arrangement of the present invention, the defect recording tracks in each defect management recording area are separated from each other by at least one track other than the defect recording tracks. Thus, a possibility that more than one defect recording track is damaged by a single defect is quite small. Further, if the defect recording tracks are separated by a plurality of tracks other than the defect recording tracks, such a possibility can be substantially eliminated.

Further, because the defect recording tracks are separated from each other at least one track other than the defect recording tracks, the defect management recording areas are separated by the track other than the defect recording tracks as well. Hence, a possibility that more than one defect managing recording area is damaged at the same time by a single defect is quite small. Consequently, a highly reliable optical disk having excellent resistance to defects can be realized. Here, "the track other than the defect recording tracks" includes a vacant track, a data recording track, etc.

Also, an optical disk apparatus of the present invention is characterized by being furnished with:

a defect management information recording/reproducing portion for recording/reproducing defect management information into/from a plurality of defect recording tracks aligned separated from each other by at least one track other than the plurality of defect recording tracks, the plurality of defect recording tracks being provided in each of a plurality of defect management areas aligned separately along a radius direction of an optical disk for recording the defect management information used in managing a defective sector; and a data recording/reproducing portion for recording/reproducing data by avoiding the defective sector based on the defective management information.

According to the above arrangement, the optical disk includes a plurality of defect management areas, each having a plurality of defect recording tracks for recording the defect management information and separated from each other by at least one track other than the defect recording tracks. The defect management information recording/reproducing portion records/reproduces the defect management information into/from the defect recording tracks in the optical disk. Also, the data recording/reproducing portion records/reproduces data by avoiding the defective sector based on the defect management information.

In other words, the defect management information recording/reproducing portion records/reproduces the defect management information into/from the defect recording tracks which are provided in each defect management recording area so as to be separated from each other by at least one track other than the defect recording tracks. Thus, a possibility that more than one detect management recording area becomes inoperable at the same time by a single defect is quite small. Hence, according to the foregoing optical disk apparatus, the defect management information will not be lost and data can be recorded/reproduced adequately by avoiding the defective sector in a reliable manner.

For a fuller understanding of the nature and advantages of the invention, reference should be made to the ensuing detailed description taken in conjunction with the accompanying drawings.

DESCRIPTION OF THE EMBODIMENTS

Referring to the accompanying drawings, the following description will describe an optical recording disk and an optical disk apparatus employing the same in accordance with one embodiment of the present invention. The following will explain, as an example, a magneto-optical disk using both the lands and grooves as the recording tracks, and a magneto-optical disk apparatus employing the same.

Figure 2:
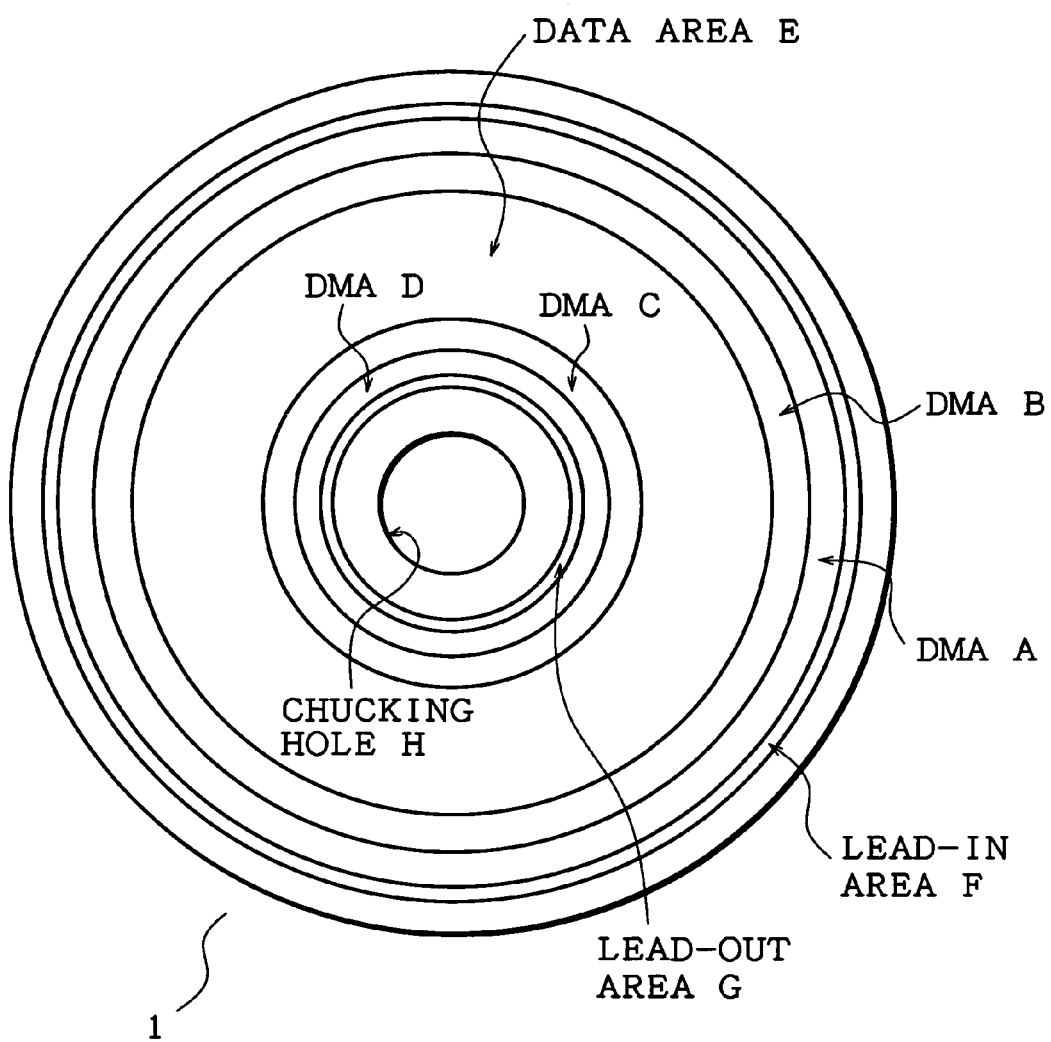
FIG. 2 is a view explaining a disk format of an optical disk in accordance with one embodiment of the present invention.

FIG. 2 shows an example area format showing an alignment of DMAs (defect management area, defect management recording area) on a magneto-optical disk 1 (hereinafter, referred to as simply disk 1). In the disk 1, a data area (data recording portion) E used in recording or reproducing image information or the like by the user's manipulation is provided at the center of the disk 1 along the radius direction. The data area E may be additionally provided with an alternate area which is used exclusively in saving a defective sector.

At the both sides of the data area E, DMAs A, B, C, and D used in recording/reproducing defect management information (information as to an address of the defective sector or the structure of the optical disk, etc.) are aligned as illustrated in FIG. 2. The outer side of the outermost DMA A is a lead-in area F, and the inner side of the innermost DMA D is a lead-out area G. The disk 1 is provided with spiral tracks heading from the outer side to the inner side, and therefore, information is recorded/reproduced from the outer side to the inner side.

Figure 1:
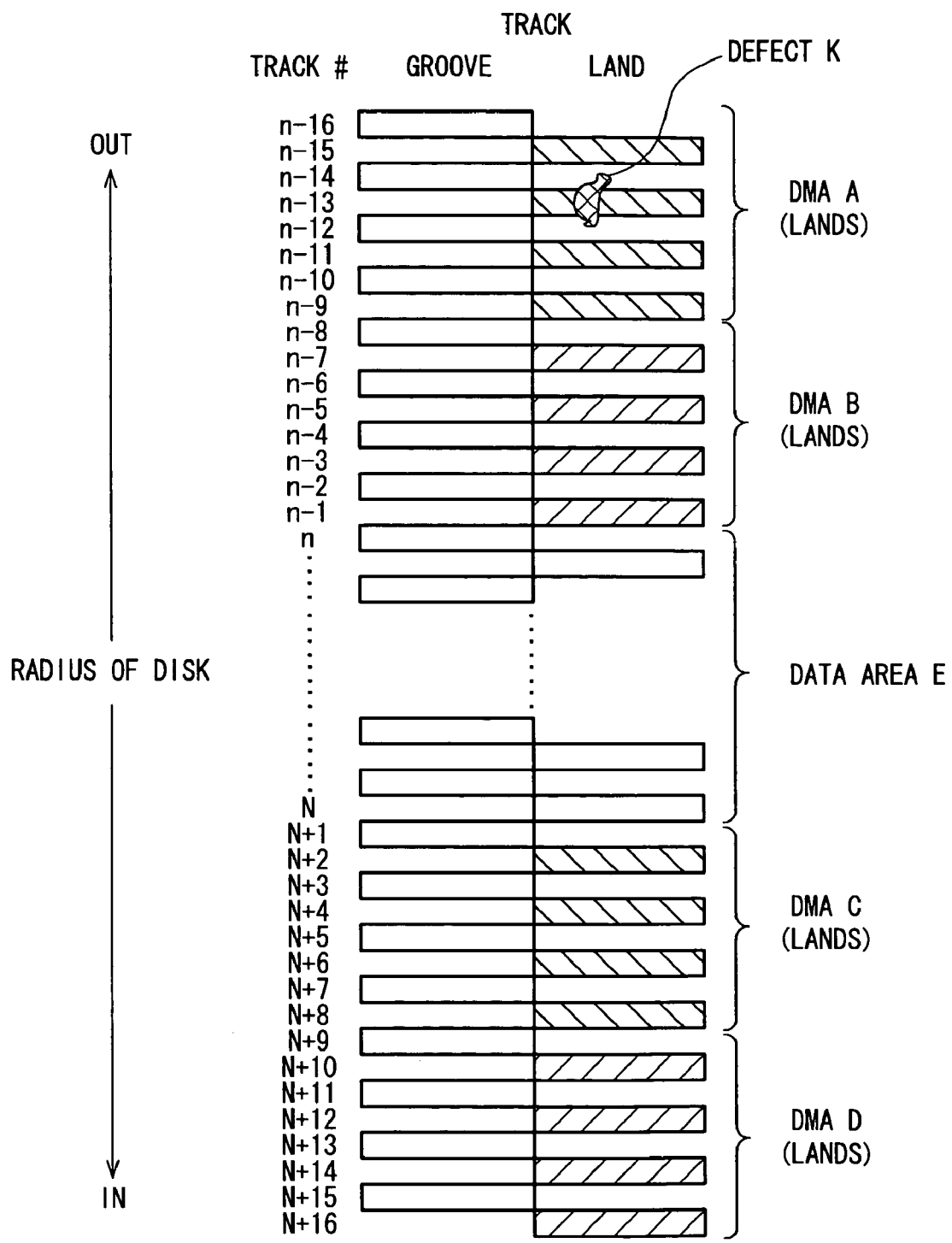
FIG. 1 is a view explaining an example alignment of DMAs in an optical disk in accordance with one embodiment of the present invention.

Although it will be described in detail below, the defect management information is recorded into the DMAs at least in every other track (that is, one or more tracks other than the defect recording tracks are secured between two recording tracks). FIG. 1 shows a developed view explaining the physical alignment of the DMAs A–D on the disk 1. In the present embodiment, the defect management information is recorded in every other track in the lands in each of the four areas, DMAs A–D.

In the first place, recording/reproducing into/from the DMA A will be explained. If a defect K wider than a recording track width is caused over a recording track n-13 in the DMA A, damages from the defect K are limited to the recording track n-13, because the adjacent recording tracks n-12 and n-14 are vacant tracks having stored no defect management information. Consequently, the defect management information can be recorded/reproduced correctly.

If a larger recording track pitch is given, that is, the defect management information is recorded in every other three tracks, for example, the DMAs' resistance to defects is increased further. Thus, it goes without saying that the foregoing arrangement can increase possibility of correctly recording/reproducing the defect management information.

If a larger defect K is caused and the DMA A becomes no longer operable, because the DMA B in close proximity is positioned behind the DMA A (at the inner side of the last track of the DMA A) and the DMAs A and B are not aligned alternately, a possibility that both the DMAs A and B become inoperable at the same time is quite small, On the other hand, the lands and grooves which altogether constitute the recording track are composed of two spirals one for each. In this case, a laser spot converged on the recording track records or reproduces the defect management information on the recording track n-7 and moves onto the recording track n-5 as the disk rotates once, and onto the recording track n-3 as the disk rotates further once. Thus, as has been discussed, by providing the recording tracks (defect recording tracks, defect management recording portion) for recording the defect management information in every other track (the number of spirals minus one), the defect management information in the DMA B can be recorded or reproduced along the spiral. In other words, by providing the recording tracks for recording the defect management information in every other track (the number of spirals (two, herein) minus one=1), the defect management information can be recorded/reproduced successively into/from the DMA A, B, C, or D without causing a track jump. This can shorten the time required to record/reproduce the defect management information, thereby increasing a processing rate of the optical disk apparatus.

Figure 3:
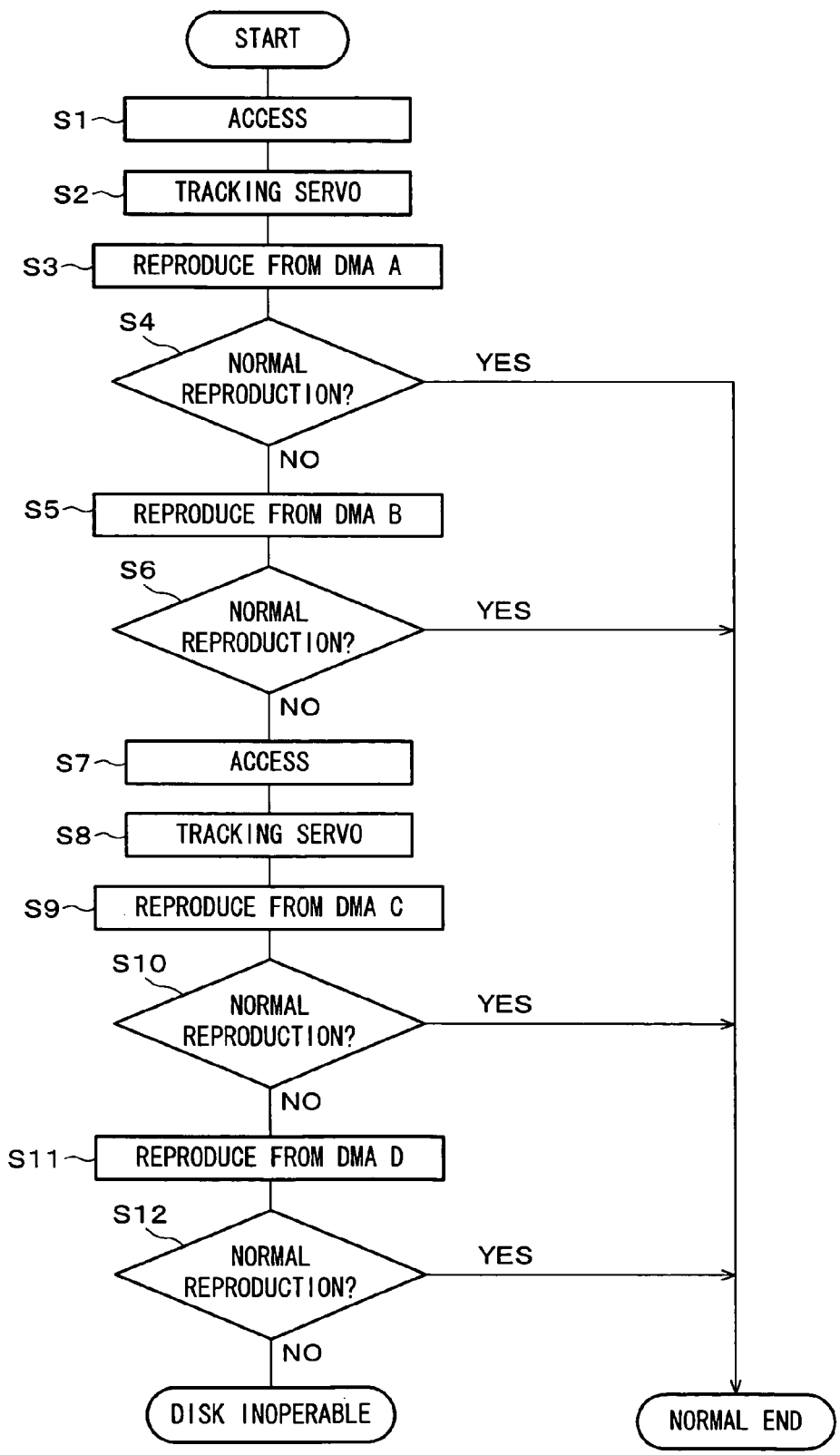
FIG. 3 is a flowchart detailing a reproducing action from DMAs in an optical disk in accordance with one embodiment of the present invention.
Figure 4:
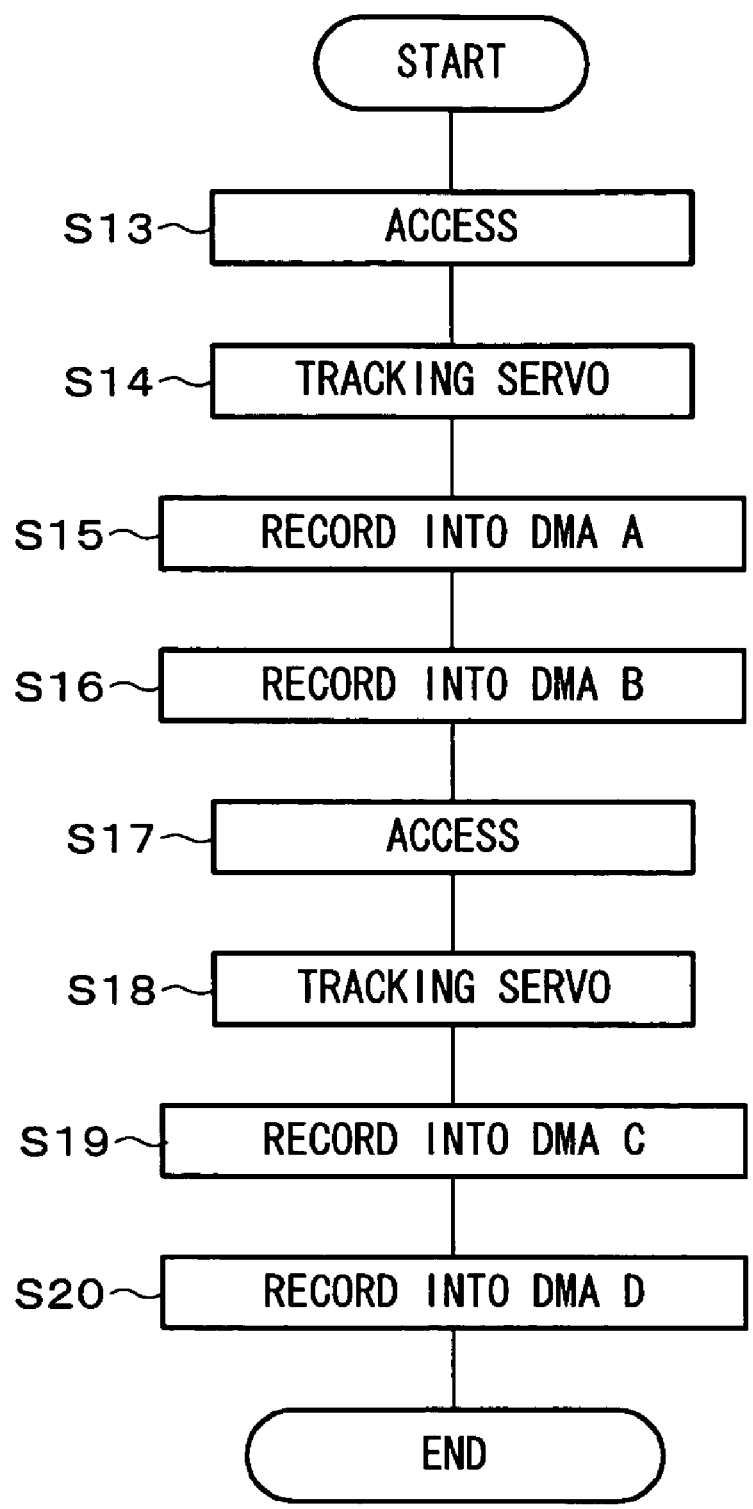
FIG. 4 is a flowchart detailing a recording action from DMAs in an optical disk in accordance with one embodiment of the present invention.

Next, the following will explain the recording/reproducing actions into/from the DMAs. FIGS. 3 and 4 show flowcharts detailing operations of the magneto-optical disk apparatus of the present embodiment when recording/reproducing the defect management information into/from the DMAs.

FIG. 3 shows the reproduction of the defect management information. The reproduction of the defect management information starts when a magneto-optical disk is inserted into the magneto-optical disk apparatus. That is, the head of the DMA A is accessed (S1) followed by tracking servo in the land track (S2). Then, reproduction from the DMA A starts from the outer side to the inner side, after which whether the defect management information is reproduced correctly or not is judged (S4). If the defect management information is reproduced from the DMA A correctly, the reproduction is terminated. In case that the defect management information is not reproduced correctly form the DMA A, reproduction from the DMA B starts successively from the outer side to the inner side (S5). Then, whether the defect management information is reproduced correctly or not is judged (S6). If the defect management information is not reproduced correctly again, the head of the DMA C positioned in the inner side is accessed (S7), and the defect management information is reproduced from the DMAs C and D as necessary in the same manner (S8–S12).

FIG. 4 shows recording of the defect management information. That is, when a new defective sector is detected, new defect management information is generated (not shown), and the head of the DMA A is accessed as is in the case of reproduction (S13) followed by tracking servo in the land track (S14), and the defect management information is recorded into the DMA A from the outer side to the inner side (S15). Subsequently, the defect management information is recorded again into the DMA B from the outer side to the inner side (S16). Then, the head of the DMA C is accessed (S17) and the defect management information is recorded into the DMAs C and D sequentially (S18–S20).

As has been discussed, in the optical disk of the present embodiment, the defect management information is recorded/reproduced successively into/from the lands in the DMAs A and B, and the defect management information is recorded/reproduced successively into/from the lands in the DMAs C and D. Thus, no access action is taken while the defect management information is successively recorded/reproduced into/from the DMAs A and B, or DMAs C and D, thereby realizing high-speed recording/reproducing of the defect management information.

In the above example case, the defect management information is recorded successively on the lands in the DMAs A–D, and it does not make any difference whether the defect management information is recorded on the lands or grooves in each DMA.

Figure 5:
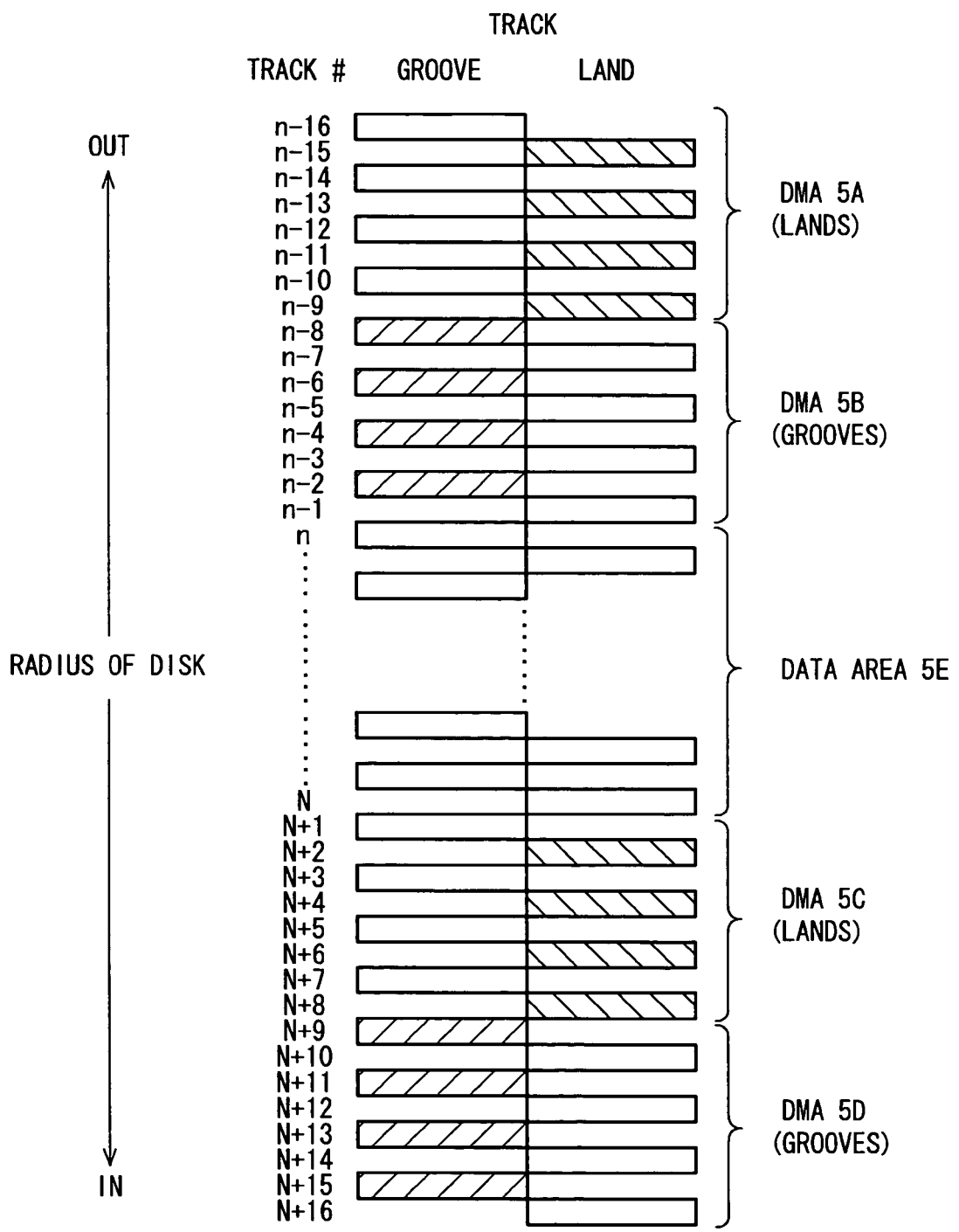
FIG. 5 is a view explaining another example alignment of DMAs in an optical disk in accordance with one embodiment of the present invention.

For example, in case of FIG. 5, the defect management information is recorded on the lands in the DMAs 5A and 5C, and on the grooves in the DMAs 5B and 5D.

Figure 6:
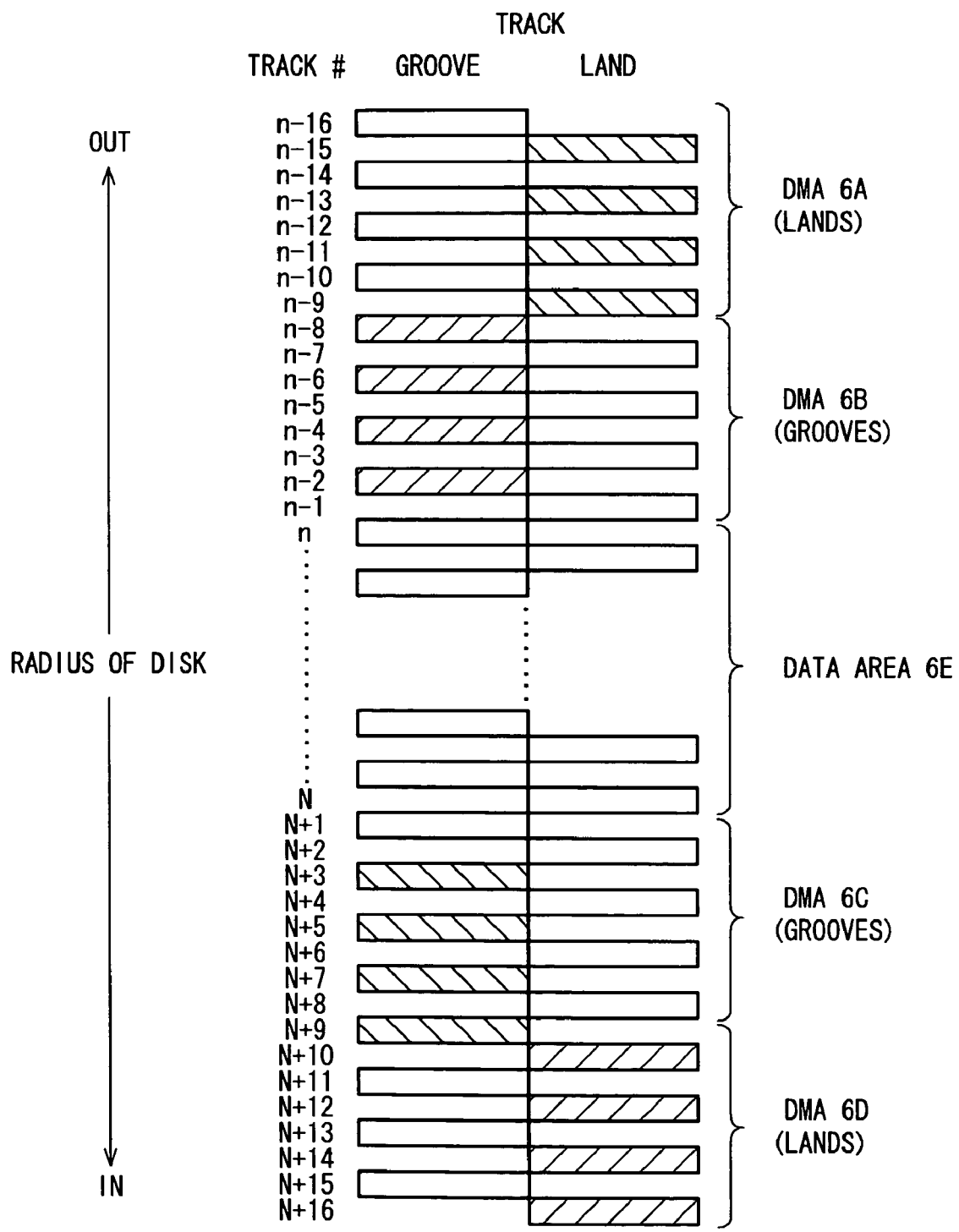
FIG. 6 is a view explaining a still another example alignment of DMAs in an optical disk in accordance with one embodiment of the present invention.

In case of FIG. 6, the defect management information is recorded on the lands in the DMAs 6A and 6D, and on the grooves in the DMAs 6B and 6C.

Figure 7:
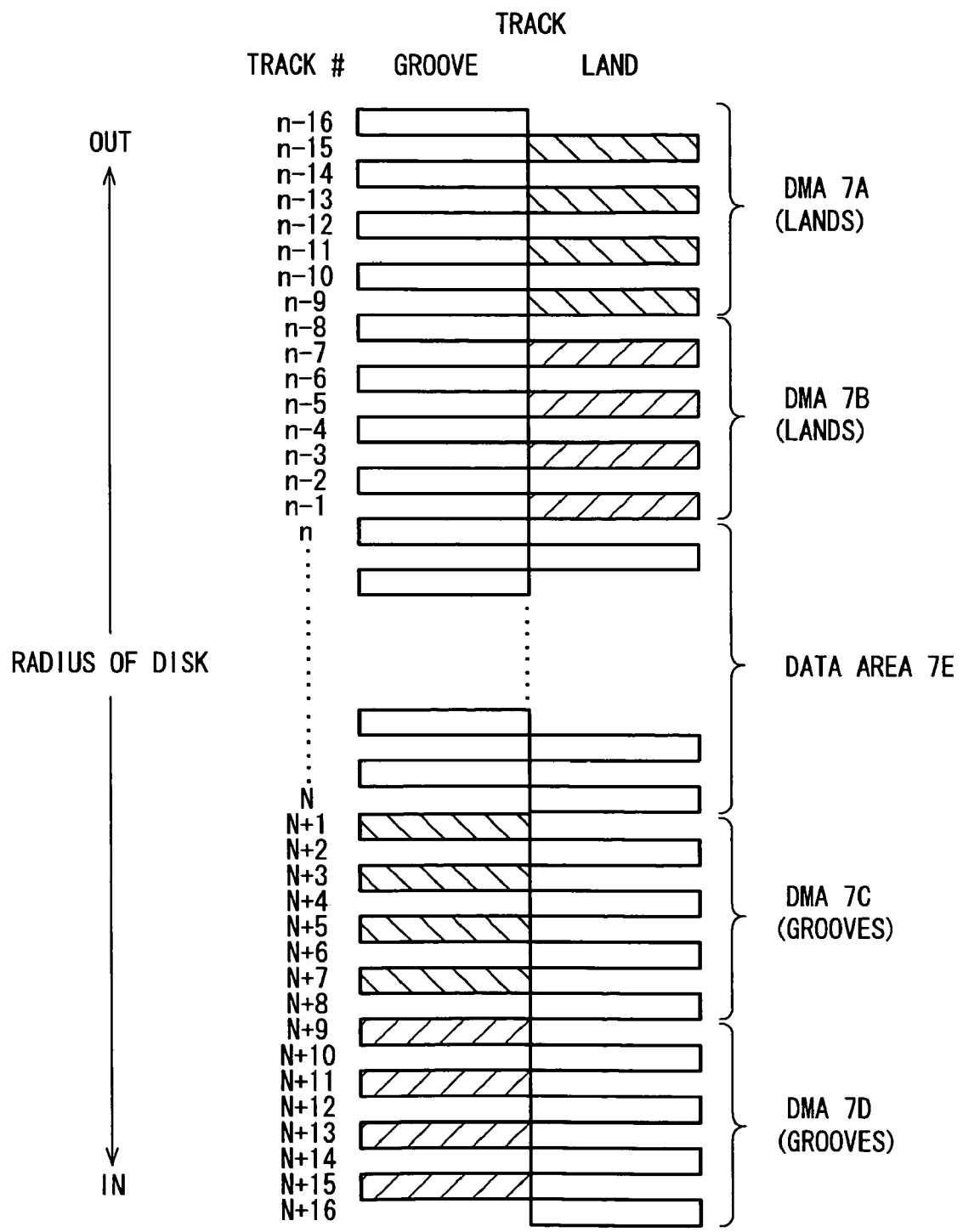
FIG. 7 is a view explaining a still another example alignment of DMAs in an optical disk in accordance with one embodiment of the present invention.

In case of FIG. 7, the defect management information is recorded on the lands in the DMAs 7A and 7B, and on the grooves in the DMAs 7C and 7D. It should be appreciated that, in any of the foregoing arrangements, the resistance to defects in each DMA can be improved.

In case of FIGS. 5 and 6, although the lands and grooves have to be switched between two adjacent DMAs for the tracking servo during the recording/reproducing, no access action is involved, thereby maintaining a high processing rate.

According to the arrangements shown in FIGS. 1, 5–7, tracks fewer than the given number of spirals (two, herein) are given as a pitch between the adjacent recording tracks into which the defect management information is recorded. Hence, the access action can be controlled and the processing rate can be increased.

Next, the following will explain a case (disk 1a) where at least as many tracks as the given number of spirals (two herein) are given as a pitch between the adjacent recording tracks into which the defect management information is recorded.

Figure 8:
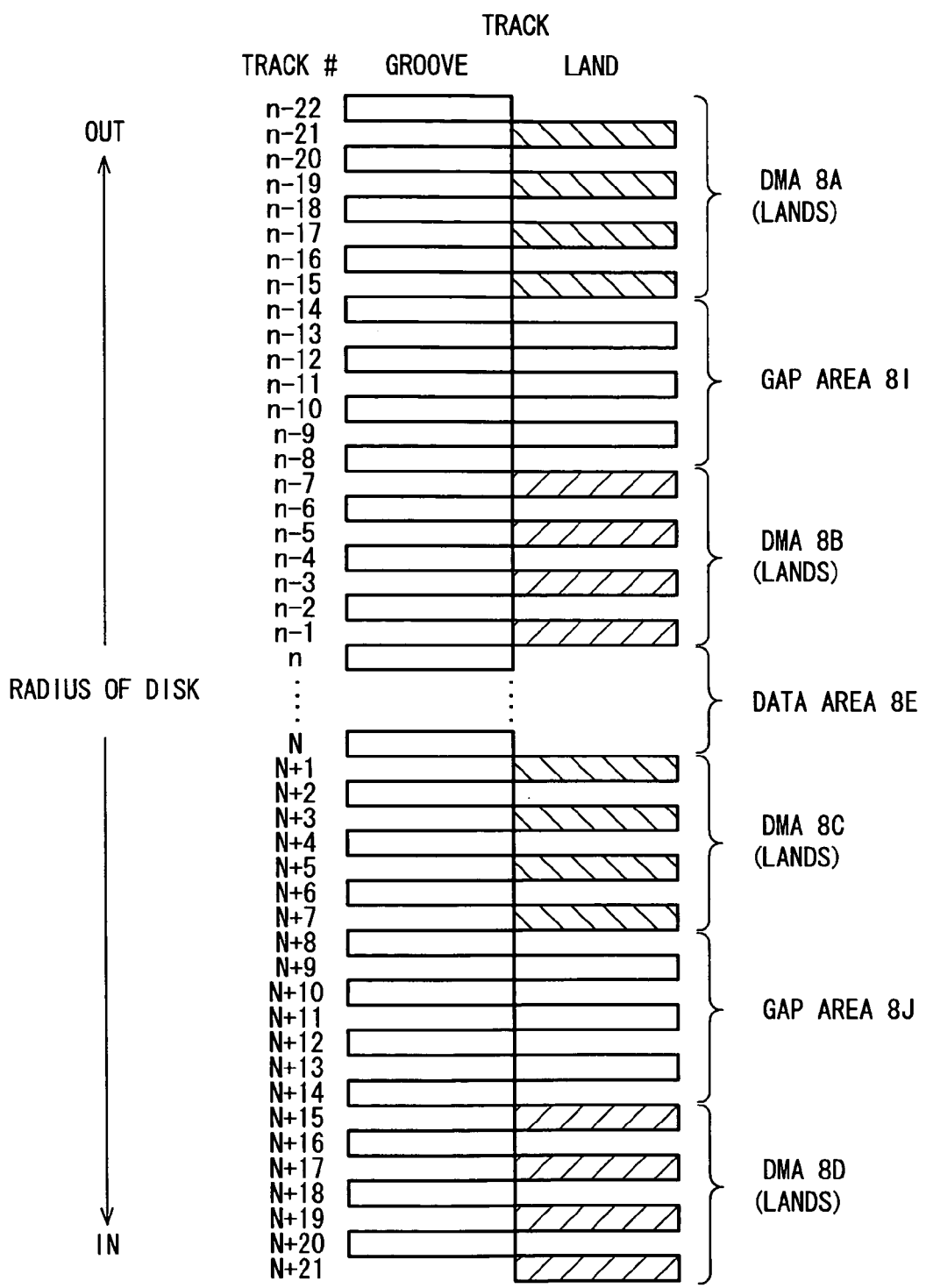
FIG. 8 is a view explaining a still another example alignment of DMAs in an optical disk in accordance with one embodiment of the present invention.
Figure 9:
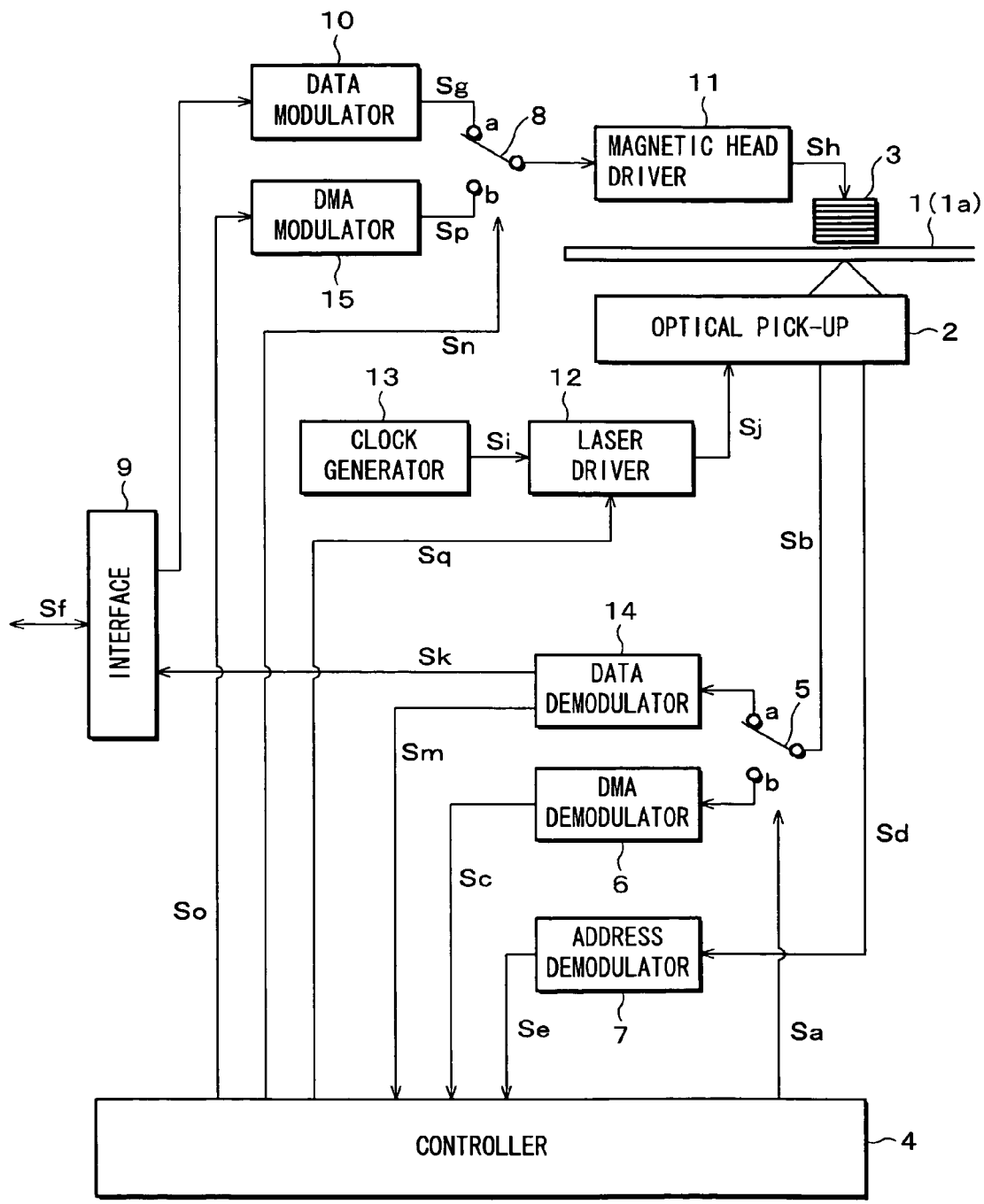
FIG. 9 is a block diagram depicting an example arrangement of an optical disk apparatus in accordance with one embodiment of the present invention.

FIG. 8 shows the above case, and gap areas 8I and 8J are provided between two adjacent DMAs, that is, between the DMAs 8A and 8B and between the DMAs 8C and 8D, respectively.

According to the above arrangement, even if a defect occurs in the vicinity of the last track in the DMA 8A, the gap area 8I reduces a possibility that the defect affects both the DMAs 8A and 8B.

Generally, a defect which possibly lies over more than one DMA along the radius direction is not greater than tens of micrometers. Thus, if a width of tens of micrometers is given to the gap areas 8I and 8J, a possibility that both the DMAs 8A and 8B, or both the DMAs 8C and 8D become inoperable at the same time is reduced to substantially 0 (zero).

As has been discussed, the optical disk 1 (1a) of the present invention includes a plurality of defect management areas, provided separately along the radius direction of the optical disk 1 (1a), for recording defect management information used in managing a defective sector. Each defect management area includes a plurality of defect recording tracks for storing the defect management information, and the plurality of the defect recording tracks are separated from each other by at least one track other than defect recording tracks (vacant tracks, data recording tracks, etc.).

In other words, according to the optical disk 1 (1a) of the present invention, by aligning a plurality of defect management areas along the radius direction so as not to superimpose over one another, and recording the defect management information in the defect management areas in every other track, the reliability of the defect management information can be improved. Also, by recording the management information in the defect management areas in every other track, inconveniences such that a defect caused in the defect management areas of the optical disk 1 (1a) makes the optical disk 1 (1a) totally inoperable can be eliminated.

Next, the following will explain a magneto-optical disk apparatus which records/reproduces data into/from the disk 1 (1a) having the foregoing DMAs format.

As soon as the disk 1 (1a) is inserted, the defect management information written into DMA is reproduced, and a controller 4 connects a switch 5 to a terminal b by using a control signal Sa.

An output signal (magneto-optical signal) Sb produced by a reflection light flux extracted from an optical pick-up 2 is sent to a DMA demodulator 6 by way of the switch 5. The DMA demodulator 6 demodulates the output signal Sb from the optical pick-up 2 and corrects an error as necessary, thereby reproducing a defect management information signal Sc. The defect management information signal Sc thus reproduced is sent to the controller 4, and the defect management information is stored into an unillustrated memory provided for the controller 4.

Here, an output signal (pit signal) Sd made from the reflection light flux extracted from the optical pick-up 2 is sent to an address demodulator 7. The address demodulator 7 extracts an address portion alone from the output signal Sd form the optical pick-up 2, and demodulates the same, thereby reproducing an address information signal Se. The address information signal Se thus reproduced is sent to the controller 4. The controller 4 controls the access action and tracking servo action of the optical pick-up 2 by means of their respective mechanism (not shown), so that the defect management information recorded in every other track is reproduced from the specified DMA based on the address information.

Then, the mode is switched to the data area recording/reproducing mode, and the controller 4 switches the switches 5 and 8 to their respective terminals a.

Input data Sf is inputted into a data modulator 10 via an interface 9. The data modulator 10 appends an error correction code to the input data Sf, and then generates a recording data signal Sg which is in effect a signal modulated into a recording code.

The recording data signal Sg is inputted into a magnetic head driver 11 by way of the switch 8. An output signal Sh form the magnetic head driver 11 is given to a magnetic head 3 so as to modulate a magnetic—field. At the same time, a clock signal S1 in sync with the recording data is inputted into a laser driver 12 in a laser diode from a clock generator 13. An output signal Sj of the laser driver 12 is given to the optical pick-up 2, and pulse-modulates an output power of a laser provided in the optical pick-up 2, whereby data is recorded into the data area in the disk 1 (1a). In the above manner, a so-called optical pulse assist magnetic field modulation recording is carried out.

As to reproduction, the output signal (magneto-optical signal) Sb made of the reflection light flux extracted from the optical pick-up 2 is sent to a data demodulator 14 by way of the switch 5. The data demodulator 14 demodulates the output signal Sb from the optical pick-up 2 and corrects an error as necessary, thereby reproducing a data signal Sk. The reproducing signal Sk thus reproduced is sent to an external device via the interface 9.

The data demodulator 14 gives an error information signal Sm to the controller 4 to check whether the reproduction data is reproduced correctly or not. Further, during the recording, the recorded data is reproduced to check whether it is recorded correctly or not (that is, the recorded data is verified).

In the data recording/reproducing mode, like in the case of reproducing the defect management information, the output signal Sd made of the reflection light flux extracted from the optical pick-up 2 is sent to the address demodulator 7, and the address information signal Se is reproduced. The controller 4 controls the optical pick-up 2 and magnetic head 3 which moves in association with the optical pick-up 2 in such a manner that the data is recorded/reproduced by avoiding the defective sector based on the defect management information recorded in the memory.

During the data recording/reproduction, if a sector is verified as being a defective sector for having not recorded/reproduced data correctly, the detect management information is updated by additionally writing the information of this new defective sector into the DMAs.

In case that the defect management information is recorded, the controller 4 switches the switch 8 to its terminal b by using a control signal Sn.

A signal So which should be additionally recorded into the DMAs is made from the defect management information in the memory and the information of the new defective sector, and inputted into a DMA modulator 15 from the controller 4. The DMA modulator 15 appends an error correction code to the signal So, and generates a defect management information signal Sp which is in effect a signal modulated into a recording code. The newly generated defect management information signal Sp is inputted into the magnetic head driver 11 by way of the switch 8. The output signal Sh from the magnetic head driver 11 is given to the magnetic head 3 to modulate the magnetic field. At the same time, an output power of the laser is pulse-modulated by the driver 12 in the laser diode, whereby the defect management information is recorded into the DMAs in the disk 1 (1a).

The controller 4 controls the access action and tracking servo action of the optical pick-up 2 by means of their respective mechanism (not shown), so that the defect management information recorded in every other track is reproduced from the specified DMA based on the address information.

Here, the DMA modulator 15, magnetic head driver 11, magnetic head 3, laser driver 12, optical pick-up 2, DMA demodulator 6, and address demodulator 7 constitute defect management information recording/reproducing means (defect management information recording/reproducing portion). On the other hand, the data modulator 10, magnetic head driver 11, magnetic head 3, laser driver 12, optical pick-up 2, data demodulator 14, and address demodulator 7 constitute data recording/reproducing means (data recording/reproducing portion).

In addition, the DMA modulator 15, magnetic head driver 11, magnetic head 3, laser driver 12, optical pick-up 2 constitute defect management information recording means.

Next, the following will explain the laser power emitted form the optical pick-up 2 when recording the defect management information.

The laser driver 12 controls the laser power to stay as a predetermined reproducing power or recording power based on a laser power control signal Sq from the controller 4.

Figure 10:
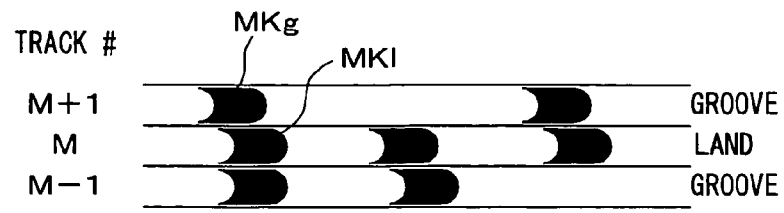
FIG. 10(a) is a view explaining record marks recorded in a data area by an optical disk apparatus in accordance with one embodiment of the present invention.
FIG. 10(b) is a view explaining record marks recorded in DMAs by an optical disk apparatus in accordance with one embodiment of the present invention.
Figure 10:
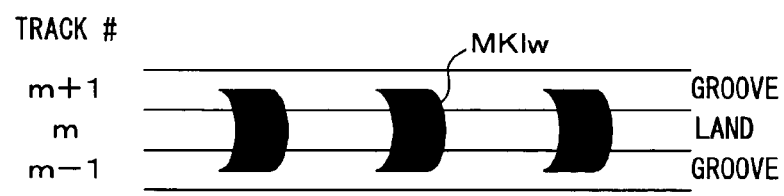
Figure 11:
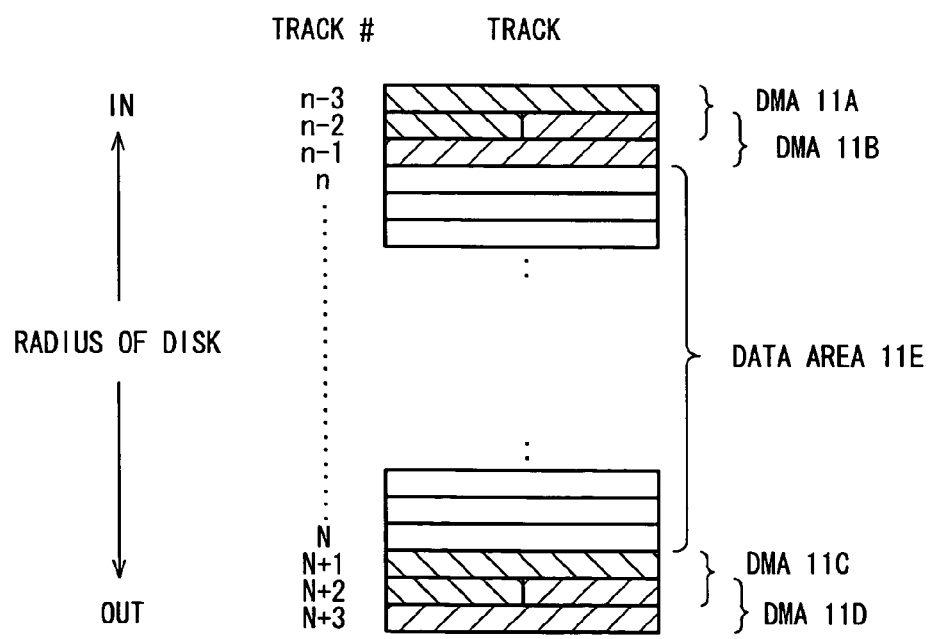
FIG. 11 is a view explaining an example alignment of DMAs in a conventional optical disk.
Figure 12:
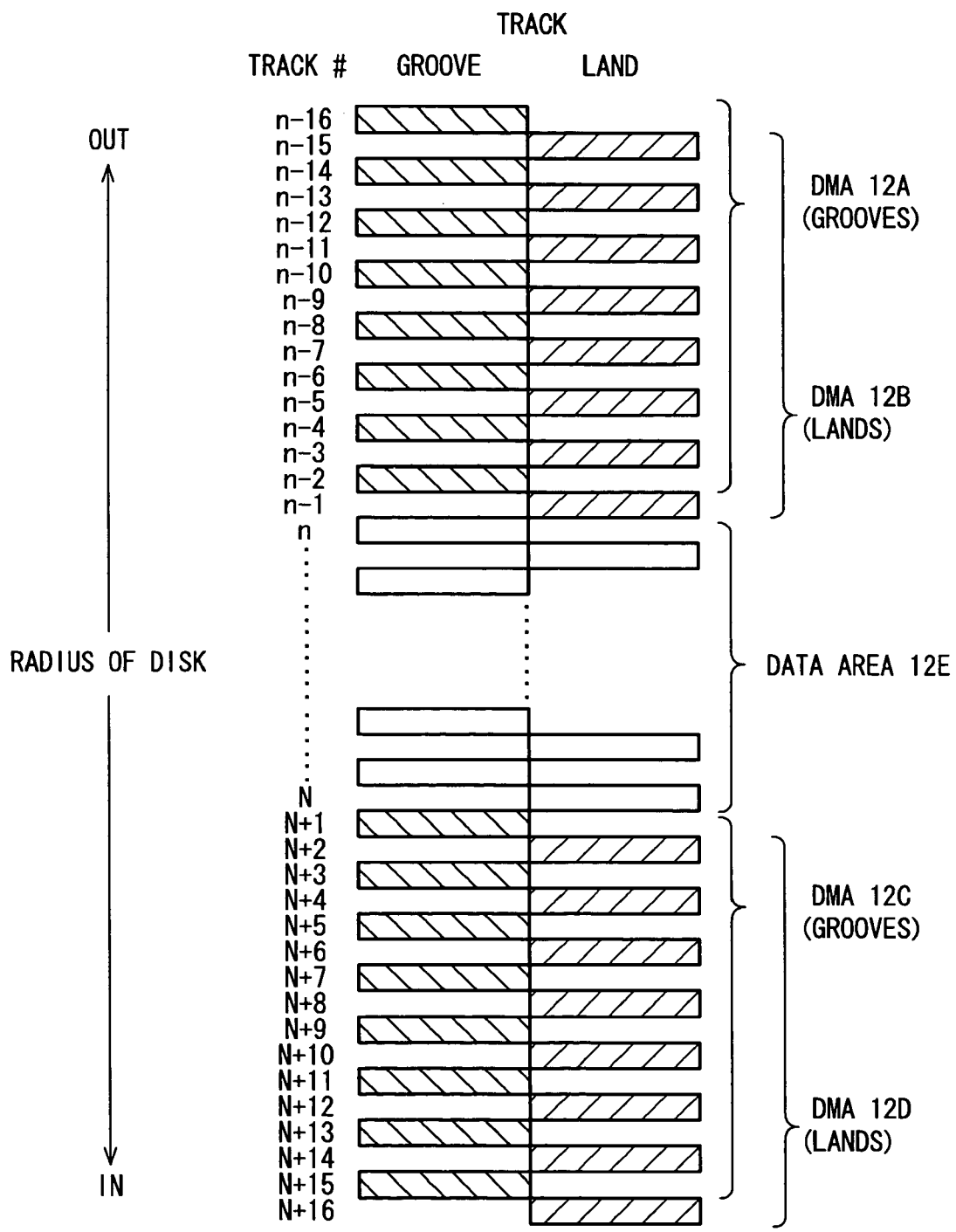
FIG. 12 is a view explaining another example alignment of DMAs in the conventional optical disk.
Figure 13:
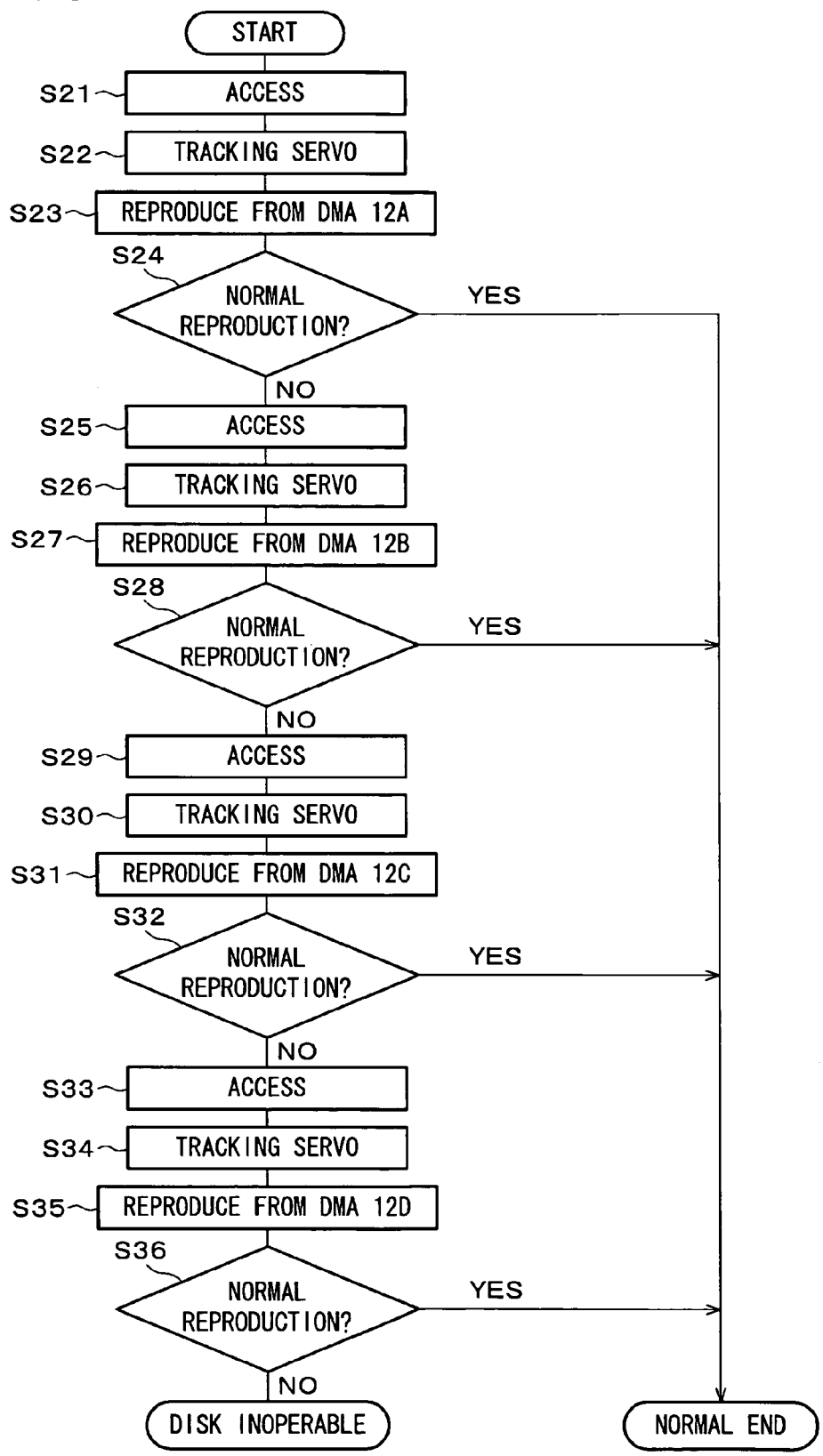
FIG. 13 is a flowchart detailing a reproducing action from DMAs in the conventional optical disk.
Figure 14:
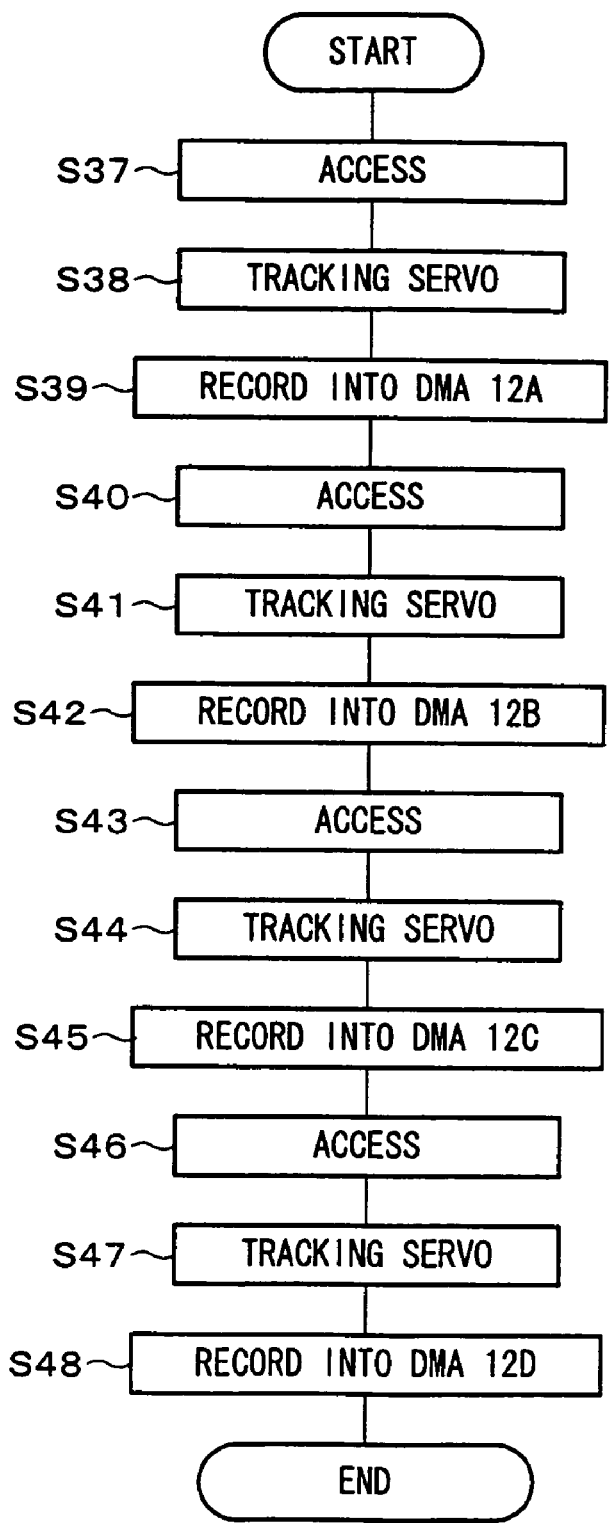
FIG. 14 is a flowchart detailing a recording action into DMAs in the conventional optical disk.

FIGS. 10(a) and 10(b) show the recording tracks in the disk 1 (1a) when the recording data or defect management information is recorded thereon. FIG. 10(a) shows record marks MKl and MKg recorded in the land and groove in the data area, and FIG. 10(b) shows a record mark MKlw recorded in the DMAs.

In case of recording into the magneto-optical disk by means of optical pulse assist magnetic field modulation, the size along the radius direction of the disc (direction perpendicular to the tracks) of the record mark recorded on the recording track is generally determined by the laser power. That is, the larger the laser power, the lager the record mark becomes, and conversely, the smaller the laser power, the smaller the record mark becomes. The quality of a reproduction signal is improved as the record mark is widened, thereby realizing highly reliable reproduction.

In the data area shown in FIG. 10(a), data is recorded on both the lands and grooves in the recording tracks. Thus, if the record mark MKl lies off the adjacent track, the record mark MKg recorded on the adjacent track will be broken. To eliminate this problem, the recording is carried out at the optimal laser power P1 at which no record mark lies off the adjacent track.

On the other hand, in the DMAs, as shown in FIG. 10(b), the defect management information is recorded on either the lands or grooves, that is, in every other track. Hence, no problem occurs if the record mark MKlw lies off the adjacent track.

Thus, when recording the defect management information into the DMAs, the controller 4 controls the laser driver 12 in such a manner so as to emit power higher than the laser power P1 used in recording data in the data area. Consequently, a large record mark such that extends in the direction perpendicular to the recording tracks can be recorded into the DMAs.

As has been discussed, by recording the defect management information in every other track and recording large record marks that lie off the adjacent vacant track, the quality of the reproduction signal of the defect management information can be upgraded, thereby further ensuring the reliability of the optical disk apparatus.

In the present embodiment, four DMAs were provided in total. However, the arrangement to obtain the effect of the present invention is not limited to the foregoing, and the number of recording tracks allocated to each DMA is not limited to the foregoing, either.

Also, two spirals are given in the present embodiment, but the present invention is applicable if more than two spirals are given. In this case, it is preferable to record the defect management information in the DMA in every (the number of spirals minus one)'th track.

The present embodiment used a disk in which both the lands and grooves are used as the recording tracks as an example. However, it goes without saying that the similar effect is attained if a disk in which either the lands or grooves alone are used as the recording tracks.

An optical disk of the present invention may be an optical disk having a recording track composed of a plurality of sectors and capable of overwriting and reproducing data sector by sector, arranged in such a manner so as to include:
  a data recording portion for recording information data; and
  a plurality of defect management recording portions for recording defect management information used in managing a defective sector in said data recording portion, said plurality of defect management recording portions being aligned along a radius direction of said optical disk so as not to be superimposed over one another, each of said defect management recording portions being aligned at a pitch of at least one recording track.

An optical disk of the present invention may be an optical disk, composed of a (a>2) spirals, including a recording track formed by a plurality of sectors and capable of overwriting and reproducing data sector by sector, arranged in such a manner so as to have:
  a data recording portion for recording information data; and
  a plurality of defect management recording portions used in managing a defective sector in said data recording portion, said plurality of defect management recording portions being aligned along a radius direction of said optical disk so as not to be superimposed over one another, each of said defect management recording portions being composed of a plurality of recording tracks aligned at a pitch of (a-1) tracks.

An optical disk of the present invention may be an optical disk arranged in such a manner that:
  said plurality of defect management recording portions include at least a first defect management recording portion and a second defect management recording portion in close proximity to said first defect management recording portion, said first and second defect management recording portions recording same defect management information; and
  a first recording track in said second defect management recording portion and a last recording track in said first defect management recording portion are provided in one of the following manners: (A) continuously and (B) at a pitch of (a-1) tracks.

An optical disk of the present invention may be arranged in such a manner that:
  said plurality of defect management recording portions include at least a first defect management recording portion and a second defect management recording portion in close proximity to said first defect management recording portion, said first and second defect management recording areas recording same defect management information; and
  a first recording track in said second defect management recording portion and a last recording track in said first defect management recording portion are aligned at a pitch of a or more tracks.

An optical disk apparatus of the present invention may be an optical disk apparatus which carrying out at least one of information recording and information reproducing by employing any of the foregoing optical disks, arranged in such a manner so as to include:
  defect management information recording/reproducing means for recording/reproducing said defect management information into/from said plurality of defect management recording portions; and
  data recording/reproducing means for recording/reproducing data by avoiding said defective sector based on management information obtained by said defect management information recording/reproducing means.

An optical disk apparatus of the present invention may be an optical disk apparatus which carrying out at least information recording by employing any of the foregoing optical disks, arranged in such a manner so as to include:
  defect management information recording means for recording said defect management information into said plurality of defect management information recording portions by emitting a laser beam having a laser power larger than a laser power used in recording the information data into said data recording portion.

In the above arrangement, the defect arrangement information recording portion means a recording portion formed by a plurality of recording tracks for recording the defect management information in the DMAs.

According to the present invention, a wider track pitch is given between the tracks for recording the defect management information. Thus, the resistance to defects of the defect management area is improved and the reliability of the disk is upgraded. In addition, a broader allowance is given for defects in the DMAs in the check-up before shipment of the disk, and as a consequence, the costs of the optical disk can be saved.

In addition, by giving (the given number of spirals minus one) tracks as a pitch between the tracks for recording the defect management information, the resistance to defects in the defect management area can be increased even for an optical disk using both the lands and grooves as the recording track and thus having a narrow track pitch; moreover, the defect management information can be recorded/reproduced successively without any track jump.

Also, by positioning the starting (first) sector of the second defect management area behind the ending (last) sector of the first detect management area, an inconvenience such that the disk becomes totally inoperable can be eliminated. Thus, the apparatus can process the defect management information at a high speed and becomes user-friendly.

Further, by providing a gap area between the first and second defect management areas, the foregoing inconvenience such that the optical disk becomes totally inoperable can be prevented in a more reliable manner.

Also, by recording the defect management information into the defect management areas by using a laser beam having a higher power than the one used in recording the data in the data area, the defect management information can be recorded in such a manner so as to lie off the adjacent track. Accordingly, not only can the quality of a reproduction signal of the defect management information be improved, but also the reliability of the optical disk apparatus can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk apparatus for carrying out information recording by employing an optical disk having a recording track composed of a plurality of sectors and capable of overwriting and reproducing data sector by sector, including: a data recording portion for recording information data; and a plurality of defect management recording areas for recording defect management information used in managing a defective sector in said data recording portion, said plurality of defect management recording areas being aligned along a radius direction of said optical disk so as not to be superimposed over one another, each of said plurality of defect management recording areas being provided with defect management recording portions for recording said defect management information, said defect management recording portions being aligned at a pitch of at least one recording track, said apparatus including:

defect management information recording means for recording said defect management information into said plurality of defect management information recording areas by emitting a laser beam having a laser power larger than a laser power used in recording said information data into said data recording portion.

2. An optical disk apparatus for carrying out at least one of information recording and information reproducing by employing an optical disk, composed of a plurality of spirals, including a recording track formed by a plurality of sectors and capable of overwriting and reproducing data sector by sector, having:

a data recording portion for recording information data; and a plurality of defect management recording areas used in managing a defective sector in said data recording portion, said plurality of defect management recording areas being aligned along a radius direction of said optical disk so as not to be superimposed over one another, each of said plurality of defect management recording areas being provided with defect management recording portions for recording said defect management information, said defect management recording portions being aligned at a pitch of (the number of said plurality of spirals minus one) tracks, said apparatus including:

defect management information recording means for recording said defect management information into said plurality of defect management information recording areas by emitting a laser beam having a laser power larger than a laser power used in recording said information data into said data recording portion.

* * * * *